No. 661,025. Patented Oct. 30, 1900.
D. C. RIPLEY & F. L. O. WADSWORTH.
MANUFACTURE OF PRISM GLASS.
(Application filed June 14, 1900.)
(No Model.) 2 Sheets—Sheet 1.
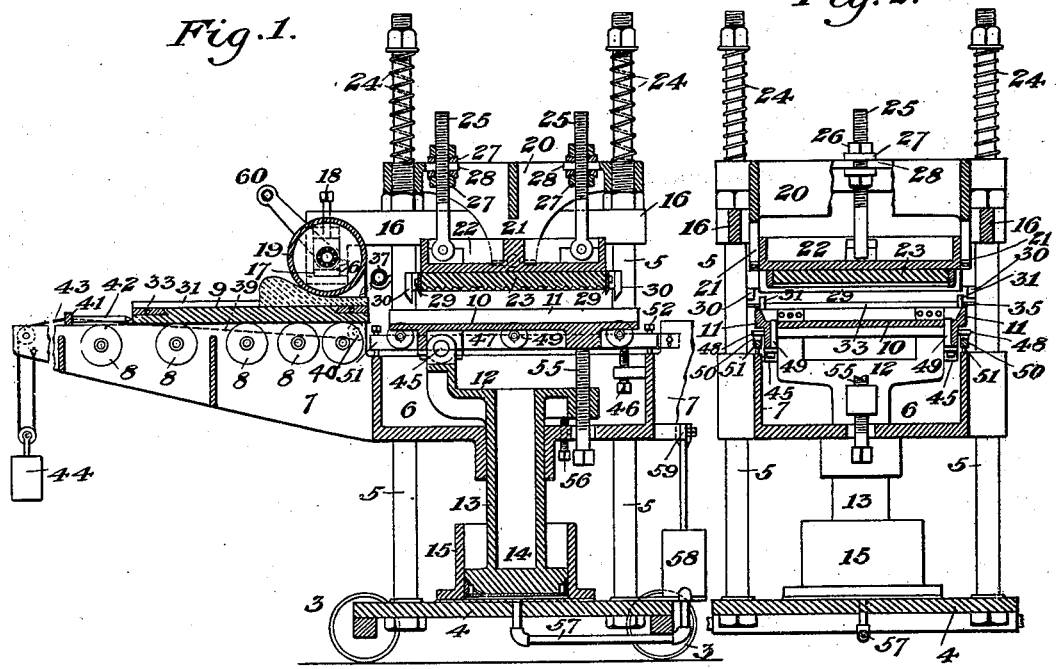

No. 661,025. Patented Oct. 30, 1900.
D. C. RIPLEY & F. L. O. WADSWORTH.
MANUFACTURE OF PRISM GLASS.
(Application filed June 14, 1900.)
(No Model.) 2 Sheets—Sheet 2.
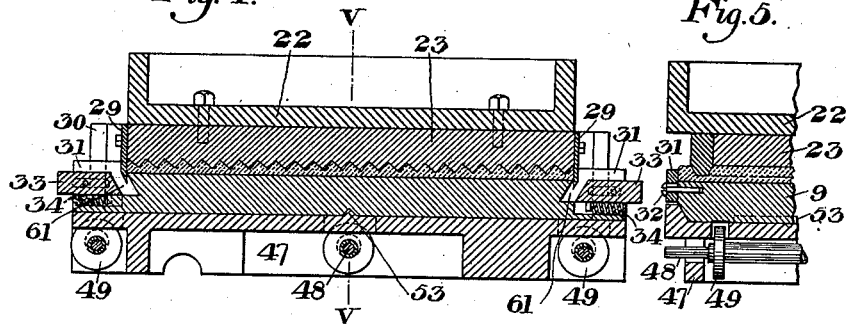
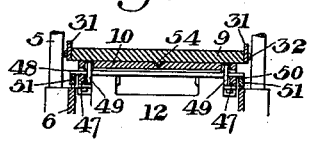
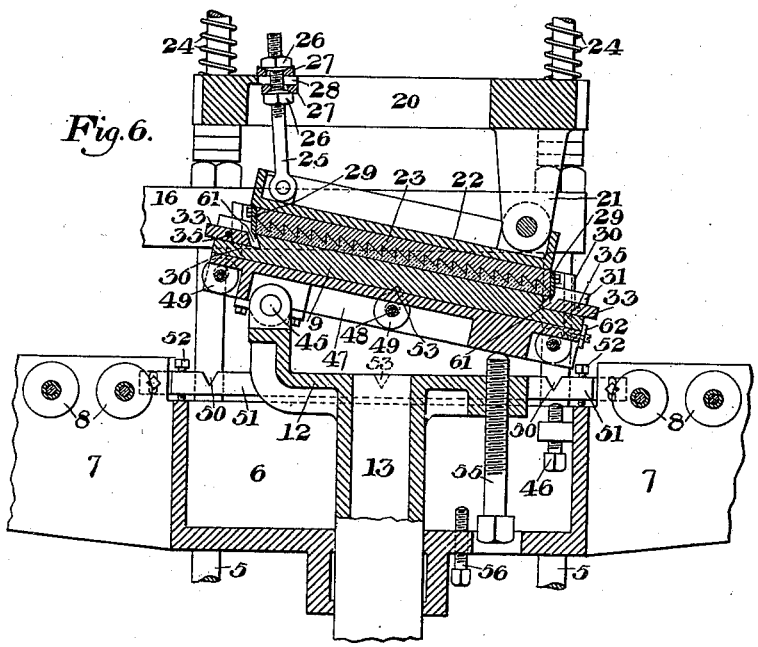
WITNESSES
INVENTORS

UNITED STATES PATENT OFFICE.

DANIEL C. RIPLEY, OF PITTSBURG, AND FRANK L. O. WADSWORTH, OF ALLEGHENY, PENNSYLVANIA, ASSIGNORS TO WILLIAM A. BOND, TRUSTEE, OF CHICAGO, ILLINOIS.

MANUFACTURE OF PRISM-GLASS.

SPECIFICATION forming part of Letters Patent No. 661,025, dated October 30, 1900.

Application filed June 14, 1900. Serial No. 20,293. (No model.)

*To all whom it may concern:*

Be it known that we, DANIEL C. RIPLEY, of Pittsburg, and FRANK L. O. WADSWORTH, of Allegheny, in the county of Allegheny and State of Pennsylvania, have invented a new and useful Improvement in the Manufacture of Prism-Glass for Illuminating Purposes, of which the following is a full, clear, and exact description, reference being had to the accompanying drawings, forming part of this specification.

Our invention relates to an improvement in the manufacture of prism-glass for illuminating purposes. Heretofore in the manufacture of such prism-glass it has been the most approved practice to press the prism-surfaces in molds in the same manner in which glass articles are ordinarily pressed, a gathering of glass being placed in the mold and the plunger being brought down upon it, so as to displace it and to cause it to flow into all the portions of the mold-cavity and to assume the contour and configuration thereof. It has been found that in this method of manufacturing it is not practicable to make prism plates or pieces of large size, and they generally have been made of not more than three or four inches square. The reason of this is the difficulty of causing the glass to flow in the mold while cool enough to prevent burning of the sharp projecting portions of the figured surface of the latter. Moreover, the prism-plate when pressed even of such small area lacks strength and is apt to be broken. It cannot be cut with a diamond, for as soon as the surface is scored by the cutting-tool it will crack and break upon irregular lines. These practical difficulties have limited the utility of such glass-prism surfaces, for the making of the pieces in small size increases the difficulty of assembling them and the frame in which they are assembled is expensive to make and is more or less unsightly and, to some extent, excludes the light. Attempts to make prism projections by making the prism-pattern in the sheet-forming roll or on the table of the rolling-machine have been unsatisfactory, so far as we are aware, on account of the difficulty in forming a permanent prism-pattern by such operation. We have discovered that all these difficulties heretofore experienced can be avoided and glass-prism surfaces made in single pieces of large area without impaired strength and capable of being cut with a diamond or other cutting device either parallel with or at an angle to the line of the prisms. We make such prism-plate by a new method, which, as distinguished from prior methods, comprises two steps—namely, producing a substantially flat sheet of glass and then forming prisms on the surface of the sheet by pressure exerted in a direction transverse to the plane of the sheet upon the entire cross-section of the portion to be ribbed. In this operation portions of the previously-rolled mass of glass while still plastic are simultaneously over the entire area covered by the die caught and confined between and in contact with the adjacent ribs by which the prisms are molded, and being thus segregated and confined are compelled to flow upward between the ribs, so as to form raised prism-shaped ridges or apices, and this systematically done over the surface of the sheet constitutes, as we believe, one of the important features of novelty and utility. By this method two important results are secured. First, inherent molecular straining of the glass is prevented, because in the preliminary spreading the glass is so hot and plastic that it flows freely and in the second step of the operation there is a slight uniform vertical motion of the glass particles, but no substantial lateral spreading thereof, and, second, definitely shaped and polished surfaces are secured by bringing the polished surfaces of the figuring-die into intimate contact with the material of the glass over the entire cross-section of the ribbed portion.

Figure 1 is a longitudinal sectional elevation showing in part one form of apparatus which we have devised for carrying out our improved process. Fig. 2 is an end view, partly in section; Fig. 3, a plan view, the die-plate being removed; Fig. 4, an enlarged longitudinal section through the dies; Fig. 5, a part transverse section on the line V V of Fig.

4; Fig. 6, an enlarged section of the central part of the apparatus, showing the dies elevated and inclined; Fig. 7, a part transverse section showing a modified form of die and table support.

The machine consists of a main frame, preferably portable and mounted, as shown, on wheels 3, on which it can be moved on suitable tracks in front of the annealing-oven. This main frame is built up of a base-plate 4, which supports four heavy steel columns 5, and of a heavy box-shaped casting 6, which is supported on these columns. At each side of the frame are heavy vertical plates 7, suitably cross-braced and between which are mounted small rollers 8, on which a movable spreading platen 9 rolls. In the center of the box-shaped casting, between the four vertical columns just mentioned, is a table 10, the top surface of which is on a level with the top surface of the rollers 8 and which has side flanges 11, the top surface and side flanges being so shaped as to receive the platen 9. This supporting-table 10 may be set to different angles, and to this end suitable adjuncts are used. For instance, the table is pivotally mounted on a carrier (shown as a tripod-head 12) which is moved vertically by suitable mechanism. As shown, the head is carried on a piston-rod 13, connected with the piston 14, moving in a cylinder 15, mounted on the base-plate 4 of the machine.

Above the table 10 and also supported by the side columns are mounted two bars 16 16, the ends of which project forward over the front end of the machine and are slotted, as at 17, to receive boxes which are adjustable vertically with reference to the platen 9 by means of screws 18 and which form the bearings for the trunnions or shaft of a roller 19. Above the bars 16 and sliding freely on the side column is a frame 20, having at opposite sides two hangers 21, in which are pivoted the trunnions of a die-plate 22, which serves as the support for the upper die 23 of the machine. The frame 20 by action of the springs 24 is held down against adjustable stops on the column 5. To hold the upper die 23 in proper relative position to the frame 20, screw-eyebolts 25 25 are provided, which are pivoted at the lower end to bosses on die-plate 22 and are clamped at the upper screw ends to the frame 20 by means of nuts 26 and washers 27, engaging on opposite sides of slotted lugs 28, projecting from the frame 20. The upper die 23 is held to the die-plate 22 by means of bolts or set-screws and has at its sides two knife-edge cutters 29 29, projecting somewhat below the lower surface of the die, and also two projecting wedge-shaped pieces 30 30, the object of which will be explained hereinafter. The platen 9 has a smooth under surface which rolls upon the surface of the rollers 8 8 and an upper surface which may be smooth or figured, as required. It has side strips 31, which may be strips attached by means of screws 32, which pass through slots in the said side strips and allow of a certain vertical adjustment of the latter, so that the top edges of these strips may be brought just in contact with the surface of the roller 19. At the ends of the table are strips 33 33, the top surfaces of which are flush with the surface of the platen 9. The inner edges of these strips are beveled, as shown, and are normally held in close contact with the edge of the recess in the table by means of springs 34, and at the ends of the strips are pins 35, which project through slots in the side plates 31. The roller 19 is hollow and, as shown in cross-section, is mounted on a hollow bar 36, which is perforated in the interior of the cylinder with a series of minute holes to provide for the admitting and burning of gas therein, if desirable, for the purpose of heating the roller. A second perforated pipe 37 is placed just behind this roller and so arranged as to direct, if desired, the gas-flame both upon the surface of the roller and upon the surface of the mass of glass which is spread upon the platen 9 as the latter passes from under the roller. Gas is supplied to these two tubes by means of suitable injector-nozzles, as at 38.

In order to move the platen 9 under the roller 19 at the same speed at which the surface of the latter revolves, two steel cords or tapes 39 are wrapped around the ends of the roller, pass over idle pulleys 40 on the frame of the machine, and backward to a cross-bar 41, which slides on the main frame of the machine, and has at the center a pin 42, which bears against the end of the platen 9. To keep the cords 39 taut, a second cord 43 is continued back to the end of the frame and there attached to a weight 44, as shown, or to a spring or some equivalent device.

The central table 10 is supported when in its lower position on the roller-bearings 45 of the tripod 12 and on two adjustable bearings, shown as screws 46, set normally at such a height that the top surface of said table is on a line with the top surface of the rollers 8 8, already described. Through the side ribs 47 of the said table are holes, through which pass loosely the ends of journals or shafts 48 of rollers 49. The ends of the shafts 48 rest when the table is down in V-shaped notches 50 in two bars 51, which are adjusted to such a height by means of screws 52 that the top surfaces of the rollers 49 are then just above the surface of the table 10. When, therefore, the table is in this position and the platen 9 is moved forward upon it, it rolls easily upon these rollers; but as soon as the table 10 is lifted above this position, carrying the rollers 49 with it, the ends of the shafts 48 are lifted out of the notches in the bars 51, allowing the rollers to descend slightly and the platen 9 to settle down into contact with the table 10, it being held in proper relation thereto by means of the beveled side flanges 11 and also small bevel projections 53, running across the lower surface of the table at right angles to these side pieces.

Any other suitable steadying devices may be used. Thus instead of the bevel side flanges 11 we may advantageously use a single bevel center strip, as shown at 54 in Fig. 7, the edges of the plate being then allowed to project over the table 10, as shown, and allowing better opportunity for attaching the side strips 31. The tripod-head 12 has at the base of its fork a screw 55, which acts as a stop and can be so adjusted as to be in contact with the lower surface of the plate 10 when the latter is level or can be run down to permit the plate 10 to take an inclined position, as in Fig. 6. Through the lower plate of the box-shaped casting 6 projects a screw 56, which serves as a stop to hold the tripod-head and its attached table 10 at the proper height.

Connected with the cylinder 15 is a pipe 57, communicating with the valve-casing 58, by means of which air can be admitted or allowed to escape from the cylinder 15 by manipulating the valve by means of the valve-lever 59.

The roll 19, carrying with it in its rotation the platen 9, is rotated by means of a crank 60 or equivalent device in the case of a small machine or by means of an electric or other motor geared thereto in the case of a larger one.

In operating the machine we proceed as follows: We first adjust the height of the roller 19 by shifting its bearings by means of the screws 18 to such a distance from the surface of the platen 9 as will produce a sheet of glass of the required thickness, the side strips 31 on the table being adjusted to such a height that they are just in contact with the lower surface of the roller, as already described. The platen 9 is run back to a position in which it is entirely from under the roller 19. Molten glass or other material is then poured upon the end of the platen next to the roller, as in making ordinary plate-glass. The roller 19 is then rotated, carrying with it the platen 9 and spreading out the glass deposited thereon into a sheet of the required thickness. The roller 19 is rotated until the platen has passed entirely under it and has been pushed by means of the pin 42 on the bar 41 against its stop 62. It now rests upon the top of the table in proper position for the V-shaped projections on the latter to engage with the corresponding grooves in the die. The valve-lever 59 is now depressed to admit air to the cylinder 15 and raise the head and the attached table toward the die 23, which figures the top surface of the sheet to the desired shape. At the same time the wedge-shaped pieces 30 engage the pins 35 35 of the strips 33 as the table rises and force the latter strips outward, as shown in Fig. 4, leaving openings 61, into which cutters 29 descend, and indent or shear off the rough ends of the glass. After the glass has remained in contact with the upper die long enough to set the valve-lever 59 is released, allowing the air to escape from the cylinder 15 and the table to descend to its lowest position. The stop 62 is then turned so as to allow the platen 9 to be drawn through to the end of the machine opposite that at which it is entered. The machine is so placed that the glass sheet may then be removed directly from this table by suitable means and placed in the annealing-oven. The platen 9 is then run back to its first position and is ready for the repetition of the operations.

In making glass sheets in which the figures or corrugations thereon have projecting portions making less than a right angle with the general surface of the sheet it is necessary in order that the finished sheet may come away or "draw" from the die that the platen 9 and the top die 23 be tilted at such an angle that when the sheet is lifted vertically the said inclined portions of the figured surface clear themselves from the die. This is easily accomplished without altering the general arrangement of the machine by simply adjusting the screw 55 downwardly to the amount desired and tilting the die-plate 22 and the attached die 23 to the required angle by means of the adjusting-screws 25. Then when the piston-head and attached tripod 12 are raised the first action is simply to tilt the table until the lower surface of the latter has come into contact with the top of the screw 55, and the whole is then raised bodily, as before, against the die-plate 23, figuring the surface as required. When the air is released from the cylinder, the head and the plate first fall together until the glass has cleared itself from the upper die 23, and then as the lower surface of the table comes in contact with the screws 46 the table resumes its horizontal position and can be drawn out at the rear of the machines, as before.

To recapitulate briefly the operation of this apparatus, we pour upon the platen 9 a gathering of molten glass, and while the same is freely plastic we pass the platen under the forming-roller 19, which distributes the glass and spreads it out into the form of a plate upon the platen 9. As the platen passes from under the roll it comes beneath the upper die 23, and then the glass being still plastic the platen and die are brought together and press upon the surface of the glass the series of prisms desired to be formed on the finished article without further spreading the glass plate at this second operation substantially beyond the limits to which it was spread by the preliminary step. Inherent strain and tension of the glass are thus prevented. The die remains in contact with the glass a brief time—two or three seconds ordinarily will suffice—so as to chill the glass sufficiently to cause it to set and retain the prism-pattern. The die is then raised, and the glass-prism sheet is removed from the machine and annealed in the ordinary way in an annealing furnace or leer. Between the operation of forming the glass sheet and the forming of the prism-pattern thereon the glass sets sufficiently or becomes sufficiently solid to retain the prism-pattern which is formed upon it without losing it by the running together of the hot glass or without burning the sharp projecting portion of the figured surface of the die.

Within the scope of our invention as defined in the claims the apparatus employed may be varied in many respects, since

What we claim as new is—

1. The herein-described method of making prism-plates of large area in two operations, consisting in producing a substantially flat sheet of glass, and then forming prisms on the surface of the sheet by pressure exerted in a direction transverse to the plane of the sheet upon the entire cross-section of the portion to be shaped into prisms; substantially as described.

2. In the manufacture of prism-plates, first spreading the glass into a sheet of at least the dimensions of the completed article while the same is freely plastic, whereby change in the relation of the particles is unaccompanied by increased tension of any part of the mass, and then, (leaving the glass sheet of the dimensions so constituted and without further spreading the glass,) forming on the surface of the sheet while still plastic prisms over the entire portion to be shaped and confining the prisms until the glass thereof has set; substantially as described.

3. The herein-described method of making prism-plates of large area in two operations, consisting in producing a substantially flat sheet of glass, and then forming prisms on the surface of the sheet by pressure exerted in a direction transverse to the plane of the sheet, upon the entire cross-section of the portion to be shaped, and confining the prisms until the glass has set; substantially as described.

4. The herein-described method of making prism-plates in two operations, which consists in producing a substantially flat sheet of glass, and then while it is still plastic applying pressure to the surface thereof in a direction transverse to the plane of the sheet and upon the entire surface to be shaped into prisms, segregating thereby portions of the plastic glass, and displacing the same upwardly into ridges of prism form, whereby the prism-plate is formed without unequal straining of the glass; substantially as described.

In testimony whereof we have hereunto set our hands.

DANIEL C. RIPLEY.
FRANK L. O. WADSWORTH.

Witnesses:
THOMAS W. BAKEWELL,
G. I. HOLDSHIP.